United States Patent

Yun et al.

[11] Patent Number: 6,047,189
[45] Date of Patent: Apr. 4, 2000

[54] ADAPTIVE METHOD FOR CHANNEL ASSIGNMENT IN A CELLULAR COMMUNICATION SYSTEM

[75] Inventors: Louis C. Yun, Mountain View; Craig H. Barratt, Redwood City; Christopher Uhlik, Milpitas, all of Calif.

[73] Assignee: ArrayComm, Inc., San Jose, Calif.

[21] Appl. No.: 08/729,387

[22] Filed: Oct. 11, 1996

[51] Int. Cl.[7] .................................................. H04Q 7/22
[52] U.S. Cl. .......................................... 455/452; 455/522
[58] Field of Search .................................. 455/450, 451, 455/452, 453, 464, 509, 510, 512, 513, 516, 517, 423, 424, 425, 522

[56] References Cited

U.S. PATENT DOCUMENTS

| | | | |
|---|---|---|---|
| 5,345,596 | 9/1994 | Buchenhorner et al. | 455/450 |
| 5,367,559 | 11/1994 | Kay et al. | 455/425 |
| 5,430,760 | 7/1995 | Dent | 455/522 |
| 5,465,399 | 11/1995 | Oberholtzer et al. | 455/522 |
| 5,475,868 | 12/1995 | Duque-Anton et al. | 455/452 |
| 5,497,505 | 3/1996 | Koohgoli et al. | 455/34.1 |

*Primary Examiner*—Dwayne D. Bost
*Assistant Examiner*—Myron K. Wyche
*Attorney, Agent, or Firm*—Townsend and Townsend and Crew LLP; Henry K. Woodward; Dov Rosenfeld

[57] ABSTRACT

An adaptive method for channel assignment in a cellular multiple access wireless communication system that has a cell station (CS) and a number of subscriber stations augments existing channel assignment protocol and thus is downward compatible with existing time division multiple access (TDMA), frequency division multiple access (FDMA), code division multiple access (CDMA), and spatial division multiple access (SDMA) system protocols. The method adaptively determines the power required for establishing an acceptable quality connection between a subscriber station and the cell station and provides an early warning trial signal for advising existing connections that a new connection is about to be established. The early warning, followed by a pause, provides a basis and a time interval for taking corrective interference action if the trial signal indicates that an unacceptable level of interference will result if the trial connection is established. The early warning signal and associated pause are useful for intracellular and intercellular interference management.

32 Claims, 6 Drawing Sheets

| R | SS | PR | UW | CI | CSID | PSID | IDL | CRC |
|---|----|----|----|----|------|------|-----|-----|
| 4 | 2  | 62 | 32 | 4  | 42   | 28   | 34  | 16  |

ADAPTIVE METHOD FOR CHANNEL ASSIGNMENT IN A CELLULAR COMMUNICATION SYSTEM

FIELD OF INVENTION

The adaptive method for channel assignment relates to wireless communication systems and more specifically to the assignment of traffic channels in cellular, wireless local loop, and personal communications systems having a base station and a set of subscriber stations.

BACKGROUND OF THE INVENTION

A typical cellular telecommunication system cell is organized about a cell station (often called a base station) equipped with multiplexing equipment for accepting incoming telephone land lines and multiplexing the incoming voice lines onto a radio frequency (RF) carrier that is broadcast by an antenna system over the region that the cell is designated to cover. Individual subscriber stations are each equipped to receive the broadcast modulated carrier and to demultiplex the specific channel that carries the data that is intended for it to receive. Often, two way conversation is supported by full duplex operation on each traffic channel. Hence, the label traffic channel will be used in the context of full duplex operation. An uplink traffic channel is the portion of a traffic channel carrying data from a subscriber station to a cell station, and a downlink traffic channel is the portion of a traffic channel carrying data from a cell station to a subscriber station.

In a typical wireless communication system, an assigned RF bandwidth of frequencies is simultaneously shared by multiple subscribers using various multiple access techniques. Most commonly, frequency division multiple access (FDMA) and time division multiple access (TDMA) techniques are used for sharing the assigned bandwidth amongst a number of subscribers. FDMA subdivides the available bandwidth into a number of sub-bands. Each sub-band accommodates a carrier that is modulated by a subscriber's data In TDMA, multiplexing of multiple subscribers is accomplished by time-sharing in which each subscriber involved in a connection is allocated a periodic time-slot for transmission of its data as a packet. Lately, code division multiple access (CDMA) methods have been introduced for accommodating multiple subscribers on a single carrier (or subcarrier) in which each subscriber is assigned a code waveform that is used to modulate the carrier for each bit of digital data. Each active subscriber having an assigned coded waveform taken from a set of orthogonal waveforms allows the system to separate (demodulate) the individual subscriber transmissions.

Cellular communication systems may also include the use of the more recently introduced spatial division multiple access (SDMA) technique that provides increased subscriber system capacity in systems that use FDMA, TDMA, and/or CDMA methods without any increase in allocated RF bandwidth (Roy, III et al., U.S. Pat. No. 5,515,378) through the use of cell station antenna arrays. SDMA exploits the spatial distribution of subscribers in order to increase the usable system capacity. Because subscribers tend to be distributed over a cell area, each subscriber will tend to have a unique spatial signature characterizing how the cell station antenna array receives signals from, and transmits signals to, the subscriber cell station antenna array. Consequently, the cell station, by determining the spatial signature, has the potential to control the radiation pattern of the cell station antenna array so that the effective antenna gain in the direction, or vicinity, of each active subscriber is optimized, i.e. a lobe maximum is created for each direction, or vicinity, and each lobe is sufficiently narrow so that each active subscriber can be isolated at the cell station for both transmission and reception. The necessary data (referred to as the spatial signature of a subscriber) for implementing SDMA is obtained empirically from the transmissions received by the cell station from each active subscriber. It should be noted that non-spatial multiplexing (e.g., FDMA, TDMA, and CDMA), when used in combination with controllable antenna array patterns that are controlled by using spatial signatures, is referred to as SDMA in the context of this invention. (In practice, spatial signatures and antenna arrays can be used in a non-spatial-division-multiple-access system configuration for enhancing communications between the cell station and subscribers by use of spatial signal processing techniques. In these cases, the label SDMA will still be used in the context of the description of the invention that follows.)

A practical system may consist of one or any combination of CDMA, FDMA, and TDMA techniques. For, example, a combination of FDMA and TDMA techniques may be used in which a set of sub-bands are each further divided into time slots.

If the spatial signatures are used, the effective radiation patterns of the antenna array can allow more than one subscriber to use a given packet time-slot. For example, if the effective radiation pattern of a first subscriber results in a relatively low energy "null" in the vicinity of a second subscriber sharing a packet time allocation, and the second subscriber's spatial signature results in a null in the vicinity of the first subscriber, the simultaneous RF packet transmissions will not cause interference upon reception at the two subscriber stations. Also, transmissions from the two subscribers to the cell station will be separable at the cell station. Under these ideal conditions, the spatial signatures are said to represent an "orthogonal" implementation.

The concept of orthogonality also applies to FDMA and TDMA systems. If each subcarrier in a FDMA is completely isolated so that the modulating data in any of the subcarriers does not affect the data modulating any other subcarrier, then all subcarrier channels are orthogonal to one another. Similarly, in a TDMA system, if each subscriber channel allocated packet data has no effect on any other active channel, the channels are orthogonal to each other.

Orthogonality can be destroyed in each of these multiple access systems. For example, intrachannel interference can result in FDMA systems from carrier frequency offsets and imperfect filters; in TDMA systems from clocking errors and instabilities; in CDMA systems from synchronization inaccuracies or RF multipath; and in SDMA systems from antenna pattern leakage caused by finite dimensional antenna arrays. In practical systems that may involve hundreds of subscriber stations, full orthogonality between every subscriber station can not be insured because of the complexity and cost that such a requirement would place on the system design. Also, an underlying motivation for the use of cellular systems is the re-use of the same RF spectrum in cell areas assigned to different locations. This frequency re-use principle introduces inter-cell interference which can severely degrade communication quality if not carefully controlled, and ultimately limit system capacity.

Because of the fragile nature of orthogonality and because of the interference introduced by cellular frequency re-use, all cellular multiple access communication systems need a method for channel assignment that minimizes the adverse effects caused by less than perfect orthogonality between channels when a new subscriber connection is added to system.

Also, because a basic tool for minimizing interference is the management of radiated power, it is important that minimum radiated power be used by both subscriber and cell stations so as to minimize any interference that may result in any practical multiple access communication system. Also, because any practical implementation must recognize that RF transmissions in one cell can create interference in another neighboring cell, because fall orthogonality between neighboring cellular systems is generally impractical, and because direct real-time communications between neighboring cell stations may not be feasible, a further requirement of a cellular system is that means be provided for minimizing adverse effects from any interference that results from operating one cellular system in the neighborhood of another. Because real-time intercellular communications between cell stations may not exist or may not be feasible, the minimization of the adverse effects of intercellular interference must be considered even in the absence of direct real-time communication between cell stations.

Figure 1:
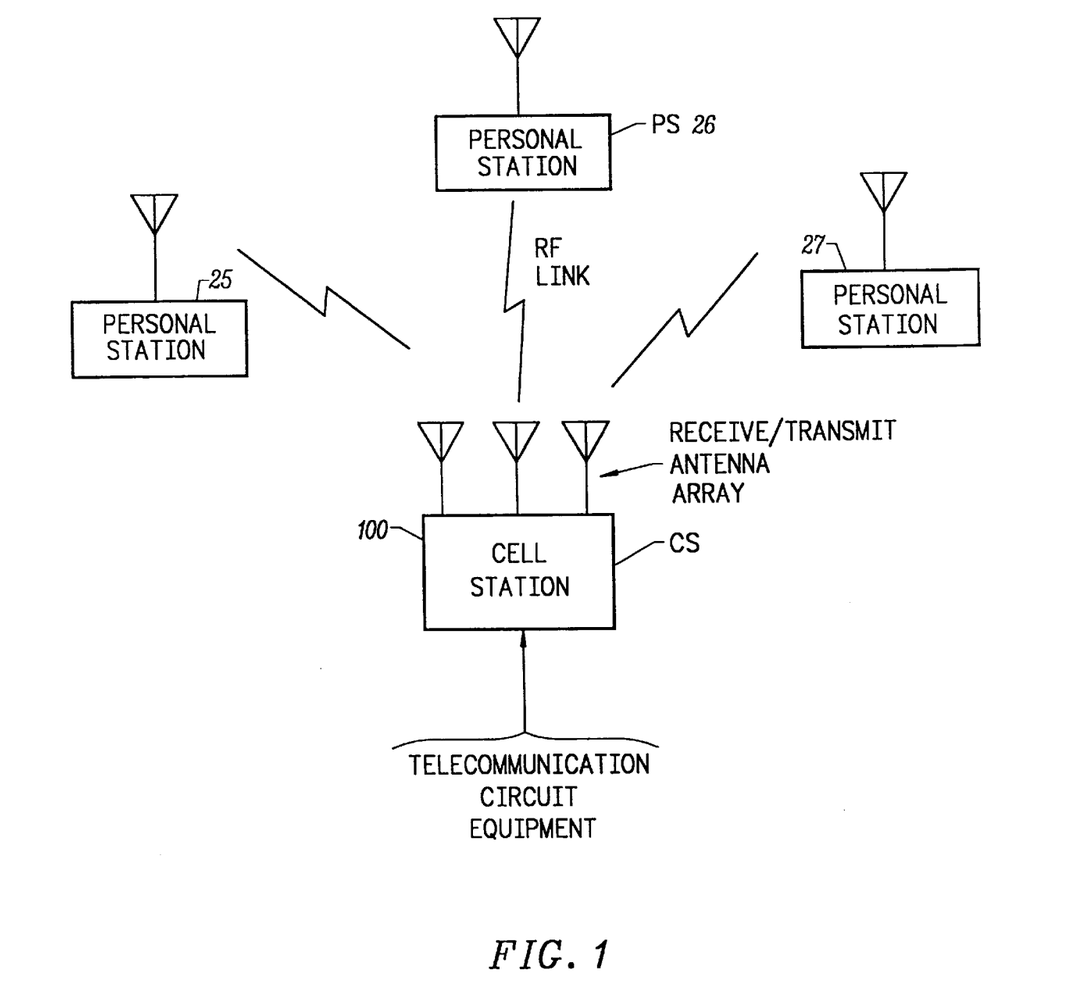
FIG. 1 shows the relationship between a personal station (PS) and a cell station (CS) in a personal handy phone system.

A particular example of an existing protocol for establishing a connection in a cellular communication system between a subscriber station and the cell station (FIG. 1) is that which is used in the "Personal Handy Phone System" described in the Association of Radio Industries and Businesses (ARIB) Preliminary Standard, Version 2, RCR STD-28, approved by the Standard Assembly Meeting of December, 1995.

The system described by ARIB Preliminary Std., Version 2, is a digital wireless personal communication system for communicating between multiple, geographically dispersed, personal handy phone stations (PSs) and a cell station (CS) by RF carrier, for serving the PSs in a given cell and for interfacing to standard telecommunications circuit equipment. The system includes:

(a) 77 RF carriers, spaced 300 kHz apart, over a public system RF band at 1,895–1,918 MHz;

(b) quadrature phase shift keying (QPSK) modulation using multiples of $\pi/4$ radians phase shift each symbol period;

(c) TDMA-TDD (time division multiple access, time division duplex) RF access for 4 duplex channels per RF carrier;

(d) 384 kbits/s signal transmission rate; and (e) 5 ms frame length with 120 symbols (including guard bits) per slot.

Figure 2:
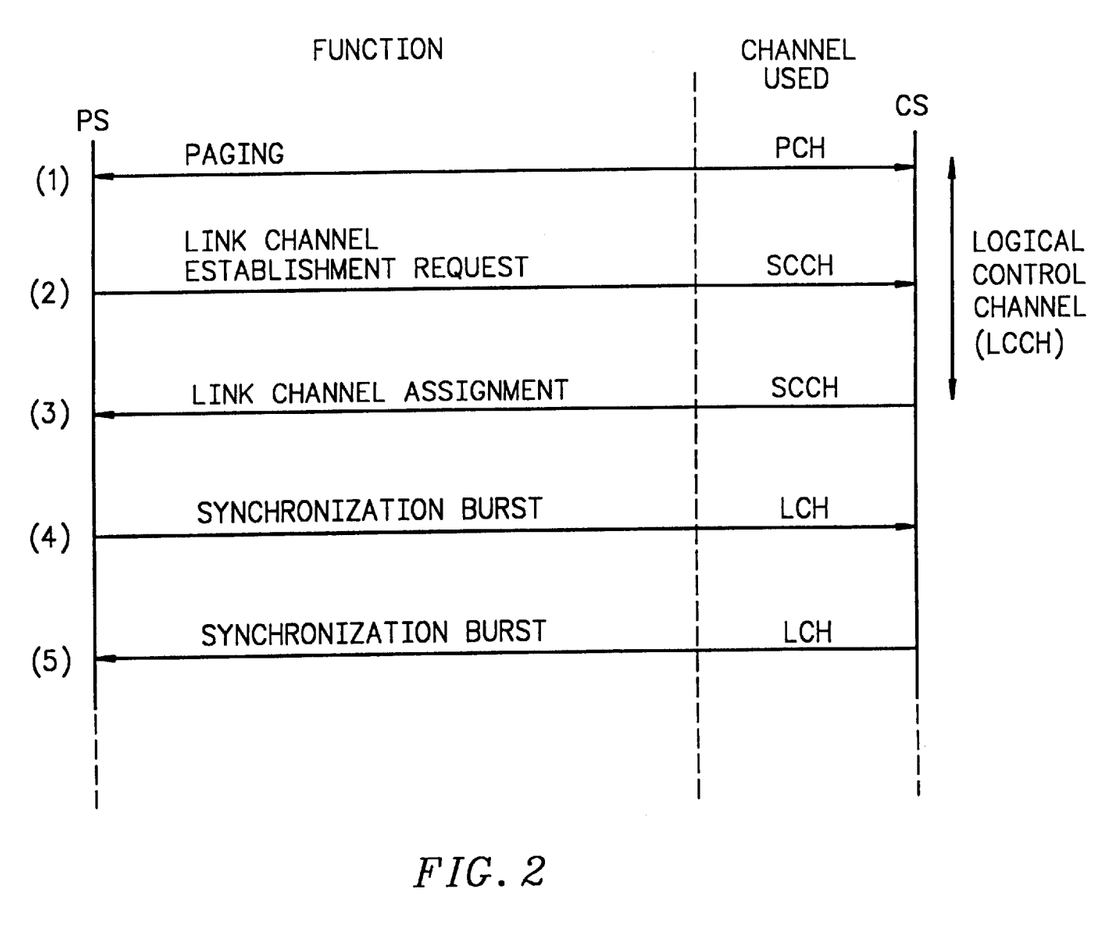
FIG. 2 shows the method of establishing an incoming call connection from a CS to a PS in a personal bandy phone system.

The control sequence for setting-up and establishing an incoming call to a PS from the CS is shown in FIG. 2. This incoming call connection establishment phase includes:

(1) the CS paging on the paging channel (PCH) of the selected PS to which an incoming connection is desired;

(2) the selected PS responding on the signaling control channel (SCCH) by sending a link channel establishment request;

(3) the CS responding to the PS request by selecting a traffic channel (TCH) and sending the selected TCH as a link channel (LCH) assignment to the PS on the SCCH;

(4) the selected PS switching to the assigned LCH and transmitting a sequence of synchronization (SYNC) burst signals followed by a sequence of idle traffic bursts; and (5) upon successful detection of a synchronization signal, the CS responds by transmitting a sequence of SYNC bursts on the LCH followed by a sequence of idle traffic bursts and then proceeding to establish a connection with the incoming call to the CS, invoking any additional optional signaling that may be required (e.g. encryption and user authentication).

The PCH is a one-way downlink point-to-multipoint channel on which the CS transmits identical information to all PSs in the paging area. The SCCH is a bidirectional point-to-point channel that transmits information needed for call connection between the CS and a PS. The TCH is a point-to-point bidirectional channel for transmitting user (subscriber) information.

The problem with the above existing procedure is that it does not provide for setting transmitter power levels that are adequate for each connection and it does not address the impact of the interference that would result from the new connection on existing subscribers.

Figure 3:
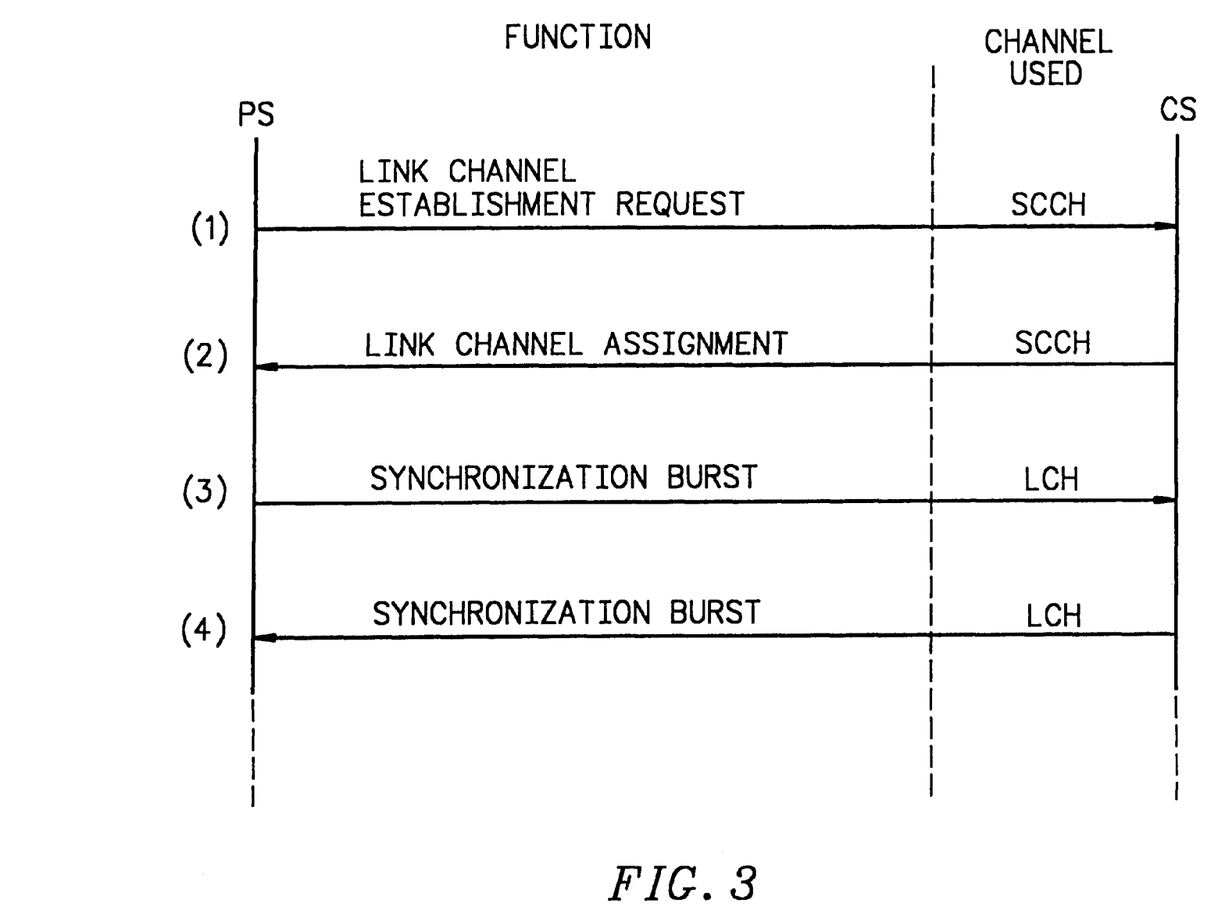
FIG. 3 shows the method for establishing an outgoing call connection from a PS to a CS in a personal handy phone system.

FIG. 3 shows the control sequence for establishing an uplink connection initiated by a PS desiring to connect to the CS for establishing a connection. The steps include;

(1) the PS sending a link channel establishment request on the signaling control channel (SCCH);

(2) the CS responding to the PS request by selecting a traffic channel (TCH) and sending the selected TCH as a link channel (LCH) assignment to the PS on the SCCH;

(3) the PS switching to the assigned LCH and transmitting a sequence of synchronization (SYNC) burst signals followed by a sequence of idle traffic bursts; and (4) upon successful detection of the synchronization signal, the CS responds by transmitting a sequence of SYNC bursts on the LCH followed by a sequence of idle traffic bursts and then proceeding to establish a connection with the incoming call to the CS, and invoking any additional optional protocols that may be required (e.g. encryption and user authentication).

As in the previous procedure for establishing a downlink connection, the procedure for establishing an up link connection suffers from the same deficiencies: no method for establishing the transmitter power levels required for adequate communications, and no method for evaluating the impact of the interference that is generated by establishing the new connection on existing users.

Figure 4:
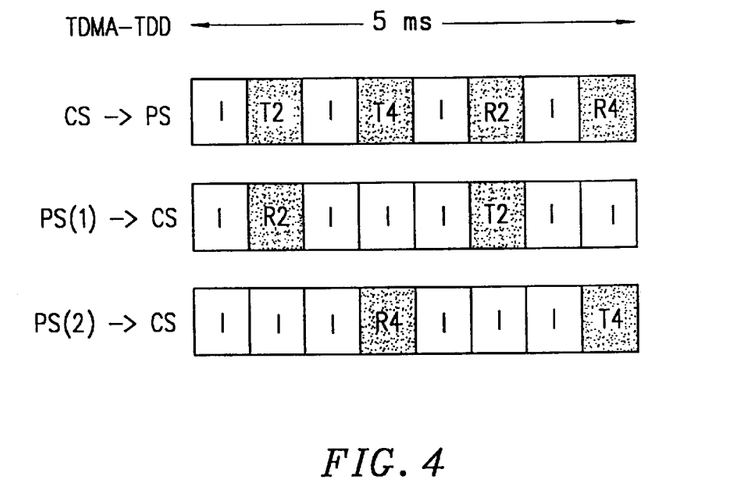
FIG. 4 shows the slot assignment of a TDD frame.

Control procedures used to establish connections with a PS use common and individually assigned time slots. FIG. 4 shows the time slot assignments used for sending and receiving in the TDMA-TDD system. The time structure of each TDD carrier is organized into 5 ms frames that are divided into 8 segments each. Each segment supports a one-way voice channel of 32 kbits/s (excluding overhead). FIG. 4 is an example that shows the activity on a common 5 ms frame when two PSs (PS(1) and PS(2), and respectively assigned to slots 2 and 4) are communicating with the CS. Normally, the first four slots are assigned for transmission by the CS and, hence, for reception by the PS to which the transmission is directed. The last four slots are used for CS reception and PS transmission. The slots labeled I indicate idle slots. The slot label T(.) indicates transmission during that slot, while R(.) indicates reception. Thus, the frame labeled (a) shows the CS activity: in slots 2 and 4, the CS is respectively transmitting to PS(1) and PS(2), while in slots 6 and 8, the CS is listening to PS(1) and PS(2) respectively. At PS(1), slot 2 is used for reception of the corresponding CS slot transmission, while slot 6 is used for transmission to the CS. Similarly, frame (c) shows the reception and transmission activity of PS(2). Thus, each frame can handle a maximum of 4 bidirectional communications between the CS and 4 PSs.

SUMMARY OF THE INVENTION

The present invention is directed to a method for implementing connections in a cellular system using multiplexing technology for efficient utilization of available bandwidth prescribed by law. The method may be part of a new protocol, or an augmentation to an existing protocol for establishing a connection between a cell station and a subscriber station. When augmenting an existing protocol, the method is completely compatible with standard protocols used in cellular systems and is completely transparent to any user of an existing cellular system.

The method for establishing an incoming call connection from the CS to a selected PS within a cellular system in response to a connection request from an external communication network connected to the CS includes the following steps:

(1) the CS paging on the paging channel (PCH) of the selected PS to which a downlink connection is desired;

(2) the selected PS responding on the signaling control channel (SCCH) by sending a link channel establishment request;

(3) the CS selecting a traffic channel (TCH) as a tentative link channel (LCH), responding to the PS request by sending the tentative LCH assignment to the PS on the SCCH;

(4) the selected PS switching to the assigned LCH and repeatedly transmitting a synchronization (SYNC) burst signal using a prescribed initial power level for the initial transmitting of the SYNC burst and incrementing the power level at each repeated SYNC burst transmission until a SYNC burst is successfully received from the CS and then transmitting a sequence of idle traffic bursts, the last power level used for SYNC burst being used for all subsequent transmissions to the CS during the ensuing connection;

(5) upon receiving an adequate quality SYNC burst transmitted by the PS (PS SYNC burst), the CS computing the PS transmitter power required based on the time delay between the CS sending the tentative link channel assignment and successfully receiving the adequate quality PS SYNC burst, the CS responding by transmitting a SYNC burst on the LCH followed by a sequence of idle traffic bursts using the computed PS transmitter power as a guide for the CS transmitter power required to adequately communicate with the PS, and then proceeding to establish a connection with the incoming call to the CS, after invoking any additional optional protocols that may be required (e.g. encryption and user authentication).

In this manner, an adequate PS transmitter power level needed for communicating with the CS is established. If the subscriber power level is incremented by sufficiently small amounts, the subscriber power level corresponding to the CS reception of an adequate quality SYNC burst can be made as close as desired to the minimum PS transmitter power required for the connection. The transmission of a known test pattern (e.g. PHS idle traffic bursts) provides an early warning to any other users in the cellular system the same frequency, time, code, or spatial channel that a new connection is being established A pause after the known test pattern can be used to evaluate if any unacceptable level of interference is experienced on connections within the cell and to perform any handoffs that may be required. The early warning also alerts neighboring cells that a new connection in a neighboring cell may require channel reassignment if an unacceptable level of interference is experienced.

A similar method is used when a PS desires to establish an outgoing connection through the CS. The steps are the same as outlined above, except that step (1) is not used because the process is initiated by the PS transmitting a link channel establishment request on the SCCH as in step (2) above.

In this manner, the entire method is compatible with, and transparent to, a standard protocol such as used by the personal handy phone system.

It should be noted that many variations on the above description are possible to the description of the invention without departing from the scope and spirit of the invention. For example, the logical control channels PCH and SCCH can be the same physical channel. The particular method described above is in terms of a PHS system for purposes of more clearly describing the application of the invention by using a specific cellular system. These and other variations that will become apparent to those skilled in the art after reviewing the figures and detailed description that follows.

DETAILED DESCRIPTION OF THE INVENTION

By way of example, the personal phone handy system (ARIB Preliminary Standard, Version 2, RCR STD-28) previously described will be used to describe the method for channel assignment in a cellular system. As will be understood by those skilled in the art, the methods to be described are suitable to other similar communication systems and may be applied without departing from the spirit and scope of the invention, which should be limited only as set forth in the claims that follow the description.

As previously stated, it is desirable that the increase in system capacity be obtained when needed without adversely impacting communication system protocols that are in existence. Ideally, the required modifications to the system protocols should be additions that are completely transparent to the original system that is to be expanded, requiring no noticeable modification to the subscriber to the original system, and having minimum impact on the cell station.

Because it is desirable in general, and because of government policy, that the minimum power required be used in effecting an RF connection in order to reduce interference between stations using a common frequency band, any protocol for establishing a connection between a PS and the CS should be based on the use of an acceptably low transmitter power in establishing and using an RF connection. To satisfy this requirement, a set of trial PS transmitter power levels can be unobtrusively introduced by the PS in step (4) and step (3) of FIGS. 2 and 3, respectively.

If the initial power level used by the PS to transmit a SYNC burst in these steps is set at a safe low level that generally would not be sufficient for acceptable quality reception by the CS, the absence of a SYNC burst reply (step (5), FIG. 2; step (4), FIG. 3) would indicate to the PS that the SYNC burst transmission power level was too low. The PS could then increase the power level and retransmit the SYNC burst each time that no SYNC is received from the CS. When a CS transmitted SYNC is finally received, the PS knows that the last used transmitter power level was sufficient. Also, by standardizing the initial PS transmitter power level used for transmitting the SYNC burst and the incremental increases for each retransmission (e.g. +3 dB), the CS would know the PS transmitter power level required because of the number of +3 dB power increments were made in the elapsed time between the link channel assignment (step (3), FIG. 2; step (2); FIG. 3) and when the PS transmitted SYNC burst was received. Because of the assumed reciprocity of transmit and receive propagation paths in time-division-duplex (TDD) systems, the CS can use the PS transmitter power level to determine the minimum transmitter power level to be used by the CS for communicating with the PS (i.e., after taking into consideration any differences in PS and CS receiver sensitivity). For non-TDD systems, the difference in transmit and receive propagation paths may be accounted for by performing on-air measurements and calibrating.

Figure 5:
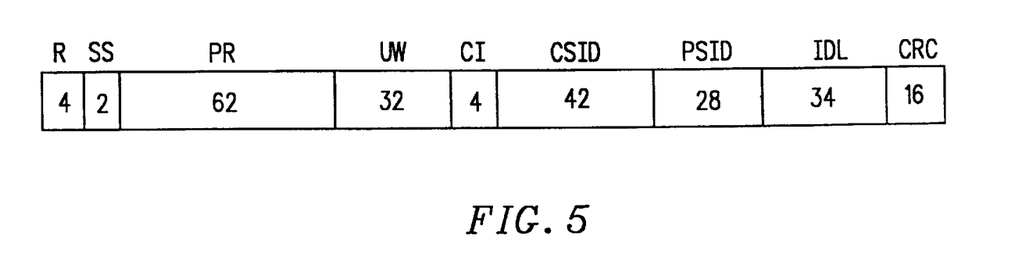
FIG. 5 shows the bit assignment pattern of a synchronization burst.

FIG. 5 shows the slot structure of a synchronization burst as specified by RCR STD-28 for uplink (PS to CS) or downlink (CS to PS) synchronization. The 224 bit duration burst includes:

R- (4 bits) any 4 bit pattern;

SS- (2 bits) fixed field 10;

PR- (62 bits) a fixed periodic preamble for both uplink and down link 0110011001100110 . . . 011001;

UW- (32 bits) a unique word for designating uplink synchronization as 01101011000100110011010111110000, or downlink synchronization as 01010000111011110010100110010011;

CI- (4 bits) fixed field 1001;

CSID- (42 bits) CS identification code;

PSID- (28 bits) PS identification code;

DL- (34 bits) all zeros, idle bits 0 . . . 00; and

CRC- (16 bits) cyclic redundancy code error detection.

It will be understood by those skilled in the art that the synchronization signal may differ with each unique implementation of the cellular system and will depend on the form of multiple access technology used. For example, in a TDMA system the synchronization burst is used to determine the best intervals at which to sample the incoming data; in a FDMA system the synchronization signal is used to determine any subcarrier frequency offset while in a SDMA system it may also be used to determine the spatial signature of the requesting PS. In all cases, the purpose is to establish the demultiplexing and signal estimation parameters required for establishing the highest quality connection.

Minimizing the amount of radiated power used in making a connection is an important factor in managing interference. Interference can occur between neighboring cellular systems because of common channel use or within a cellular system due to lack of full orthogonality between channel assignments. However, because of the difficulty in ensuring orthogonality of a new channel assignment, the connection protocol must minimize the likelihood of experiencing an unacceptable level of intracell interference and also provide practical means for managing intercell interference.

The basic intercell and intracell interference management tool is the use of an adaptive procedure to minimize radiated power, as discussed above. System modeling is another tool that provides means for predicting the consequences of a given channel assignment by computing the effects on existing cellular connections by the addition of a new connection. The model must consider the existing connections including all relevant radiated power, channel characteristics, and channel assignments and predict the level of interference that might be expected by the addition of a new connection channel.

If the system model indicates that all interference levels should be below threshold, the channel is tentatively assigned to the new connection and a trial (test) transmission by both the CS and PS is made for empirically determining if the tentative connection causes any unacceptable interference on the existing connections. The trial transmission may be followed by a pause for a prescribed interval to give the cellular system an opportunity to recover from unacceptable interference. If an unacceptable interference situation does not arise, then the connection's tentative status is removed and the connection is established Otherwise, the CS must decide on an alternative action. The alternatives form a part of a CS interference management protocol that is needed to manage interference due to any cause. The protocol may include options for re-assignment of the tentative LCH to another channel, reassignment of existing connections in order to achieve a better distribution of channel assignments, or advising the PS requesting the new connection that no channel capacity is currently available.

Figure 6:
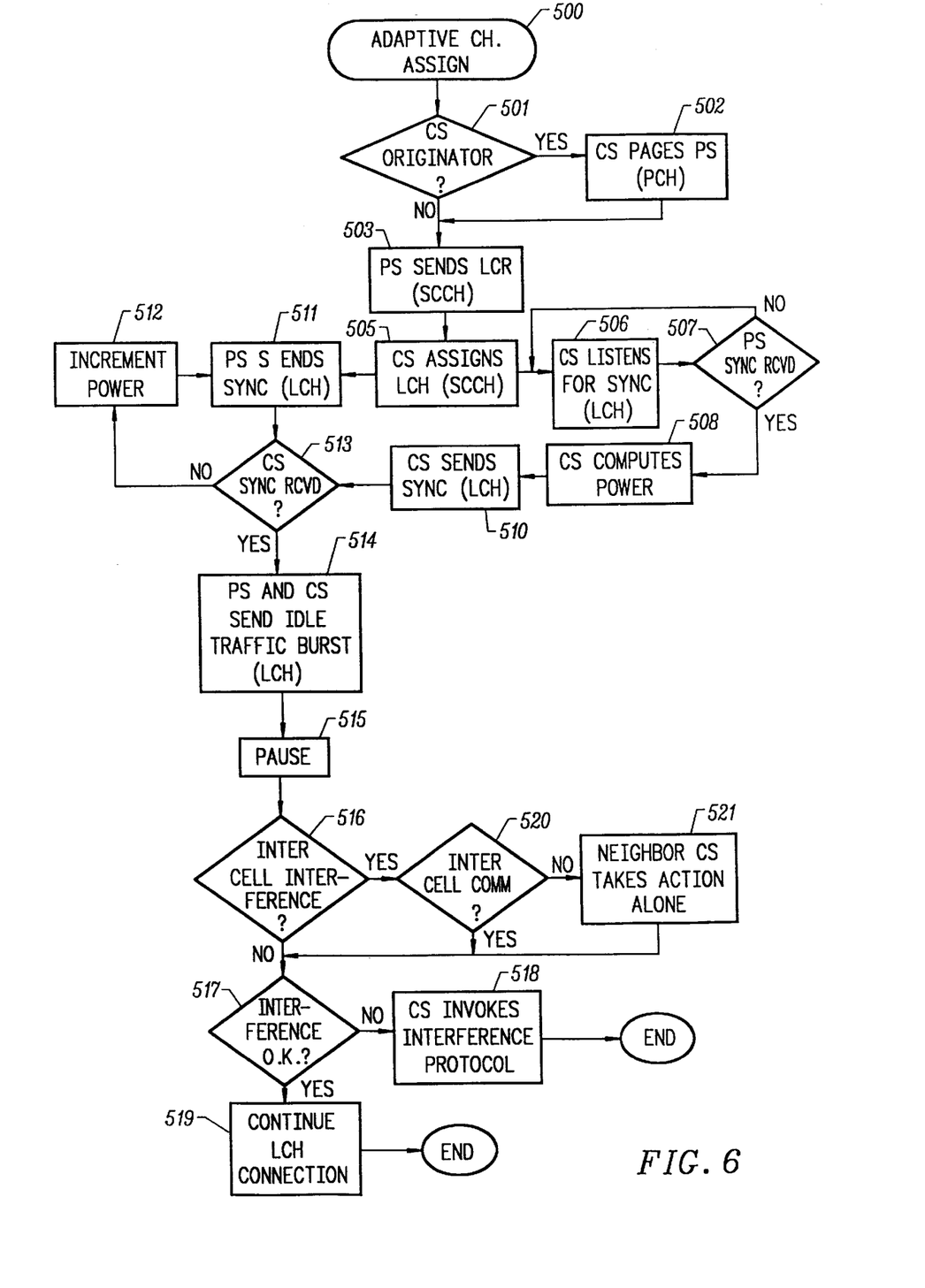
FIG. 6 is a flow diagram of the adaptive method for channel assignment.

FIG. 6 is a flow chart that summarizes a preferred embodiment method 500 for adaptively assigning channels. The method is designed to be compatible with the connection protocol for the personal handy phone system as described in ARIB Standard, Version 2, RCR STD-28 by not requiring any modification to these standards other than simple additions that provide downward compatibility.

Referring to FIG. 6, the method 500 for adaptive channel assignment begins and at step 501, checks if the CS is the originator of a connection request, and, if so, proceeds to step 502 where the CS pages the selected PS on PCH and then moves to step 503. At step 503, the selected PS sends a link channel establishment request (LCR) message to the CS on SCCH in response to the page. The CS selects the best candidate link channel (LCH) from the set of traffic channels available and transmit the selection on SCCH as a tentatively assign LCH in step 505. At this juncture, the selected PS, at step 511, sends a SYNC burst on the tentative LCH at a prescribed low power level that is approximately at the lowest possible power level at which acceptable quality reception by the CS might be expected At step 513, the selected PS checks if a SYNC burst has been returned by the CS indicating that sufficient power has been used by the selected PS to establish acceptable quality reception at the CS. If not, the PS increments the transmitter power level (typically by +3 dB) in step 512 and returns to step 511. The 3 dB power increments ensure that the power level established in step 512 will be within 3 dB of the minimum power required for quality reception. Finer increments would allow the established power level to be as close as desired to the minimum power level (e.g., +1 dB increments would ensure that the established power level is within 26% of the minimum). Meanwhile, the CS listens on the tentative LCH for the PS SYNC burst transmission, in step 506, and enters a wait loop involving test step 507 until the SYNC burst is received with acceptable quality. After receiving the SYNC burst, in step 508, the CS computes the CS transmitting power level based on the time elapsed between the CS LCH assignment in step 505 and the receipt of an acceptable quality SYNC burst in step 507. (Because the repeated transmissions of the PS SYNC burst occur at a prescribed intervals (typically −5 ms) the power required by the PS transmitter can be computed and for the −3 dB increments would be $2^{m-1}P_0$ where m is the number of power increments and $P_0$ is the prescribed initial PS transmitter power.) At step 510, the CS transmits a SYNC burst using the power level based on the computations of step 508. At step 514, upon receiving the CS SYNC burst, the selected PS and the CS transmit a sequence of idle traffic bursts consisting of 50% duty-cycle on-off bursts, typically at a rate of 200 bursts per second and typically lasting for 10 burst intervals. (A PHS idle traffic burst signal is used to indicate that a given channel does not carry any user data.) After transmitting the idle traffic bursts, a pause for a prescribed time (typically 50 ms) may be introduced at step 515 for allowing the system to report any unacceptable interference experienced from the test signal transmissions of step 514. If intercell interference results (step 516) and if communication between cell stations is available (step 520), the neighboring CSs may use the pause in step 515 to report any unacceptable interference to the CS with the new call. In the absence of inter-cell CS communication (step 520), the neighboring cells which experience unacceptable interference invoke, at step 521, a prescribed procedure from an interference management protocol for minimizing the "cost" of the resulting interference. At step 517, the CS with the new call checks if any unacceptable interference has resulted on any of the existing connections (including any neighboring cells with which communications exist) and, if not, the CS treats the tentatively assigned LCH as a new connection in step 518. Otherwise, the CS invokes a prescribed procedure at step 518 from an interference management protocol for minimizing the "cost" of the resulting interference. The interference management protocols can include a number of corrective procedures such as channel reassignment and/or handoffs to other neighboring CSs, as is well known in the art.

Although 50% duty cycle idle traffic bursts were used as examples of prescribed test or trial signals for advising that a new connection was to be established, other signal designs using different sequences of idle channel traffic bursts interspersed with no-signal intervals may be used. Whereas the idle traffic bursts indicate that no user data is being carried on a given channel, a prescribed sequence of idle traffic bursts interspersed with no signal intervals can be designated to carry additional non-userdata information. For example, a trial signal with a specific sequence pattern can be chosen to tell all stations that the message for which the connection is to be established is an emergency message (such as a "911"; call) and should be given a high priority. This allows all cellular stations that experience an unacceptable level of interference to invoke an interference protocol that is suitable for a high priority message. Multiple priority message levels could be accommodated by defining a set of distinct sequence patterns of interspersed idle traffic bursts and no-signal intervals.

It should be recognized that for the purpose of clarity in describing the method shown in FIG. 6, specific characteristics of the PHS system have been used. However, as previously stated, the method described is applicable to other cellular systems and the applicability would be apparent to those practicing the art. The method can be applied to cellular systems such as the wide-spread cellular communication system GSM (Global System for Mobile Communication) as described by Mouly, M. and Pautet, M. in "The GSM System for Mobile Communications", published by the authors at 49, rue Louise Bruneau, F-91120 Palaiseau, France, 1992.

Figure 7:
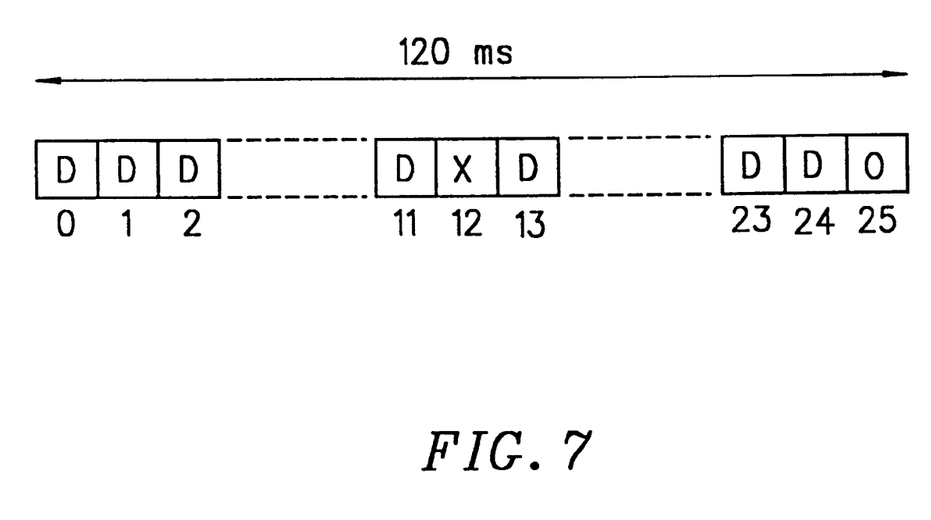
FIG. 7 shows the format of a GSM traffic channel packet.

For example, GSM has a traffic channel (TCH) packet structure for bidirectional data and in-call signaling, as shown in FIG. 7. This structure can be used to transmit an interference test signal for the same purpose as the idle traffic burst in the PHS, i.e. for use as an early warning signal that a new connection is about to be established and for determining if any unacceptable level of interference might result from that connection. The TCH cycle of FIG. 7 consists of 26 bursts over a period of 120 ms and is organized into two sequences of 24 data bursts D at positions 0–11 and 13–24. Burst X at position 12 is assigned for slow associated control channel (SACCH) bi-directional signaling and burst O at position 25 is an empty burst in which no transmission takes place.

Signaling within a GSM connection can be accommodated in two ways: using SACCH in conjunction with user data bursts; or using one or more entire cycles for signaling on a given channel during initialization of a call when no user data is being transmitted A GSM receiver is able to distinguish both modes by reading binary information transmitted on the TCH called the "stealing" flag (Mouly et al., op. cit., p. 190). Thus, either the SACCH burst or the entire GSM TCH cycle (FIG. 7) may be used for bidirectional transmission of a test signal, functionally equivalent to the PHS idle traffic burst test signal, during the initialization of a call as described previously and in step 514 of FIG. 6. Because the steps for determining transmitter power level and for pausing are communication protocol independent, the entire method can be added to the GSM cellular system without modification of the existing protocol.

The methods described for adaptively assigning channels were, for sake of clarity in the description, limited to specific cellular communication systems but, for those of ordinary skill in the art, the application of the invention to other similar communication systems, such as wireless local area networks (LANs), will become evident from the description provided without departing from the spirit and scope of the invention which should only be limited as set forward in the claims that follow.

What is claimed is:

1. An adaptive method for use in a wireless cellular communication system having a cell station and a plurality of subscriber stations, the method for minimizing interference with any existing connections between the cell station and the subscriber stations by determining an acceptable low power level required for establishing a new connection between a subscriber station and the cell station in the presence of any existing connections, the method comprising:

(a) the subscriber station requiring a new connection transmitting a first signal on the uplink traffic channel designated by the cell station at a prescribed power level;

(b) the subscriber station listening for a second signal transmitted by the cell station on the downlink traffic channel indicating that the cell station received the first signal from the subscriber station requiring a new connection with acceptable quality, and if not received, incrementing the subscriber station transmitting power level by a prescribed amount until the second signal is received thus indicating that the last used transmitting power level is sufficient;

(c) the cell station listening for the first signal transmitted by the subscriber station requiring a new connection and noting the elapsed time between the assignment of the traffic channel to the subscriber station requiring a new connection and the time an acceptable quality first signal was received at the cell station;

(d) the cell station determining an acceptably low cell station transmitting power level for use in communicating with the subscriber station requiring a new connection based on the elapsed time between the assignment of the traffic channel to the subscriber station requiring a new connection and the time an acceptable quality first signal was received at the cell station.

2. The adaptive method of claim 1 wherein the acceptably low power level is determined by computing a function of the subscriber station transmit power level and the subscriber station receiver sensitivity relative to the cell station receiver sensitivity.

3. The method of claim 1 wherein the first and second signals are synchronization signals.

4. The method of claim 1 wherein, in step (b), incrementing the subscriber station transmitting power level by a prescribed amount is performed at prescribed time intervals.

5. The method of claim 1 wherein, in step (c), noting the elapsed time between the assignment of the traffic channel to the subscriber station requiring a new connection and the time an acceptable quality first signal was received is performed by counting the number of prescribed time intervals that have elapsed.

6. An adaptive method for managing interference in a wireless cellular communication system having a plurality of cell stations and a plurality of subscriber stations, when establishing a new connection between a particular cell subscriber and a subscriber station requiring a connection, the method comprising:

(a) establishing a tentative connection on a traffic channel between the particular cell station and the subscriber station requiring a connection;

(b) the particular cell station and the subscriber station transmitting a prescribed test signal, both the particular cell station and the subscriber station using a predetermined acceptably low power level for determining if the tentative connection; and (c) if so, each station experiencing unacceptable interference levels in other than the tentative connection and recognizing the prescribed test signal, invoking a prescribed protocol for new connection interference management the adaptive method not requiring cell station to cell station communications.

7. The method of claim 6 wherein prescribed test signal is an idle traffic signal.

8. The method of claim 6 wherein the prescribed test signal is a sequence of on-off idle traffic signals.

9. The method of claim 6 wherein the prescribed test signal conveys auxiliary non-user-data information.

10. The method of claim 9 wherein the prescribed test signal conveys message priority information.

11. The method of claim 6 wherein, after the cell station and the subscriber station transmitting a prescribed test signal step, the method further comprises a step for introducing a pause of prescribed duration for allowing any cell station or subscriber station affected by unacceptable interference due to the tentative connection to take corrective action.

12. The method of claim 6 further including steps for adaptively determining a minimum effective power level required for establishing the new connection, the further included steps comprising:

(a) the subscriber station requiring a connection transmitting a first signal on an uplink traffic channel designated by the cell station at a prescribed power;

(b) the subscriber station listening for a second signal transmitted by the cell station on the downlink traffic channel indicating that the cell station received the first signal from the subscriber station requiring a new connection with acceptable quality, and if not received, incrementing the subscriber station transmitting power level by a prescribed amount until the second signal is received with acceptable quality, thus indicating that the last used transmitting power level is sufficient;

(c) the cell station listening for the first signal transmitted by the subscriber station requiring a new connection and noting the time elapsed between the assignment of the traffic channel to the subscriber station requiring a new connection and the time an acceptable quality first signal was received at the cell station;

(d) the cell station computing a cell station acceptably low transmitting power level for use in communicating with the subscriber station requiring a new connection based on the elapsed time between the assignment of the traffic channel to the subscriber station requiring a new connection and the time an acceptable quality first signal was received at the cell station.

13. The method of claim 12 for managing intracellular interference in a wireless cellular communication system further being used for also managing intercellular interference with any existing connections within a neighboring cellular system, the neighboring cellular system recognizing the prescribed test signal and invoking a prescribed interference protocol if an unacceptable level of interference results from the prescribed test signal.

14. The method of claim 12, step (a), wherein the prescribed power level approximately corresponds to a lowest power level at which acceptable quality reception by the CS might be expected.

15. The method of claim 12 where, in step (b), incrementing the subscriber station transmitting power level by a prescribed amount until the cell station first signal is received with acceptable quality, is performed at prescribed time intervals.

16. The method of claim 12 where, in step (c), noting the time elapsed between the assignment of the traffic channel to the subscriber station requiring a new connection and the time an acceptable quality first signal was received, is performed by counting the number of prescribed time intervals that have elapsed.

17. An adaptive method for channel assignment in a cellular wireless communication system having a cell station and at least one subscriber station, the method comprising:

(a) the cell station transmitting a tentative link channel assignment to a subscriber station;

(b) the subscriber station transmitting a first signal at a prescribed power level and on the assigned link channel;

(c) the subscriber station incrementing transmitting power and transmitting the first signal until a first signal of acceptable quality is received in response from the cell station;

(d) the cell station listening for the first signal transmitted by the subscriber station requiring a new connection and noting the elapsed time between the assignment of the traffic channel to the subscriber station requiring a new connection and the time an acceptable quality first signal is received at the cell station; and (e) the cell station determining a cell station adequate transmitting power level for use in communicating with the subscriber station requiring a new connection based on the elapsed time between the assignment of the traffic channel to the subscriber station requiring a new connection and the time an acceptable quality first signal was received at the cell station;

(f) the cell station transmitting a second signal to the subscriber station using the adequate power level determined in step (e) for indicating to the subscriber station that the transmitting power last used is the power level for the tentative link channel assignment;

(g) both the cell station and the subscriber station transmitting, at the power levels determined in step (e), a second signal on the tentatively assigned link channel for indicating to all stations that might experience interference that a tentative channel assignment has been made for a new connection so that, if an unacceptable level of interference is experienced, each station experiencing unacceptable levels of interference may take action in accordance with a prescribed interference management protocol, otherwise the new connection is established using the determined acceptably low power levels.

18. The method of claim 17 wherein step (a) is in response to a link channel assignment request from a subscriber station.

19. The method of claim 17, step (b), wherein the prescribed power level approximately corresponds to a lowest power level at which acceptable quality reception by the CS might be expected.

20. The method of claim 17 wherein the link channel assignment request is in response to a page from the cell station.

21. The method of claim 17 wherein the first and second signals are synchronizing signals.

22. The method of claim 17 wherein the prescribed test signal is an idle traffic signal.

23. The method of claim 17 wherein the prescribed test signal is a sequence of on-off idle traffic signals.

24. The method of claim 17 further comprising in step (g), after both the cell station and the subscriber station transmitting, pausing for a prescribed duration to allow any station affected by unacceptable interference due to the tentatively assigned connection to take corrective action.

25. The method of claim 17 where, in step (c), the subscriber station incrementing transmitting power increments at prescribed time intervals.

26. The method of claim 17 where, in step (d), noting the elapsed time between the assignment of the traffic channel to the subscriber station requiring a new connection and the time an acceptable quality first signal is received is performed by counting the number of prescribed time intervals that have elapsed.

27. An adaptive method for channel assignment in cellular wireless communication system having a cell station (CS) and a plurality of spatially dispersed personal stations (PSs), the CS for communicating with and coordinating simultaneous separate communications with each of the personal stations, the method comprising:

(a) at a PS that is requesting a connection,
 (i) transmitting a link channel establishment request to the CS on a prescribed signaling control channel (SCCH) and at a prescribed power level,
 (ii) listening on the SCCH for a CS transmitted link channel assignment assigning a full-duplex traffic channel (TCH), hereinafter called a link channel (LCH), on which a tentative connection is to be made,
 (iii) transmitting a synchronization (SYNC) burst on the LCH at a prescribed initial power level and listening for a prescribed time interval on the LCH for a SYNC burst transmitted by the CS in response that indicates that the last SYNC-burst transmitted by the requesting PS has been received with acceptable quality, otherwise repeating, in accordance with a prescribed schedule, the transmitting of the SYNC burst with an incremented power level and listening,
 (iv) sending a predetermined new connection message on the tentatively assigned LCH at the transmitter power level last used for transmitting the SYNC burst, for advising any stations that might be affected that a new connection is being initiated, and for allowing any stations affected by the tentative new connection to assess if any interference requires corrective action,
 (v) listening on the tentatively assigned LCH for a CS transmitted new connection message for determining if the new connection message transmitted by the CS on the tentatively assigned LCH was received with acceptable interference level quality, and, if the interference level quality is acceptable and no corrective action message is received from the CS, using the tentatively assigned LCH for the connection, otherwise
 (vi) transmitting a message to the CS, advising that the interference level is not acceptable and implementing any corrective action instructions from the CS; and (b) at the CS,
 (i) monitoring the SCCH for any PS connection request,
 (ii) upon receipt of a PS connection request, selecting a traffic channel as a tentatively assigned LCH,
 (iii) transmitting, on the SCCH, the tentatively assigned LCH to the requesting PS,
 (iv) listening on the tentatively assigned LCH for the requesting PS transmitting a SYNC burst,
 (v) upon receiving a SYNC burst from the requesting PS, transmitting a SYNC burst on the tentatively assigned LCH for advising the requesting PS that the transmitted SYNC burst has been received,
 (vi) monitoring the tentatively assigned LCH and all active connections for determining if transmitting a new connection message by the requesting PS causes unacceptable interference and, if unacceptable interference results, taking corrective action in accordance with a prescribed protocol for all active connections, otherwise
 (vii) transmitting a new connection message on the tentatively assigned LCH, for advising all stations that a new connection is being initiated and waiting for a prescribed time interval to determine if unacceptable interference from the transmission of the new connection message, and, if no unacceptable interference has occurred, making the tentatively assigned LCH connection the assigned connection, and otherwise (viii) taking corrective action in accordance with a prescribed protocol for all active connections.

28. The method of claim 27 wherein the link channel assignment is in response to a page from the cell station.

29. The method of claim 27 further comprising, after step (a)(iv) and after step (b)(vii), pausing for a prescribed duration to allow any station affected by unacceptable interference due to the tentatively assigned connection to take corrective action.

30. The method of claim 27 wherein the communication system is a personal handy phone system substantially as described in the Association of Radio Industries and Businesses (ARIB) Preliminary Standard, Version 2, RCR STD-28.

31. The method of claim 27 wherein the predetermined new connection message is an idle traffic signal.

32. The method of claim 27 wherein the prescribed test signal is a sequence of on-off idle traffic signals.

* * * * *